UNITED STATES PATENT OFFICE.

ADOLF CLEMM, OF MANNHEIM, GERMANY.

METHOD OF MAKING SULFURIC ANHYDRID.

SPECIFICATION forming part of Letters Patent No. 716,985, dated December 30, 1902.

Application filed October 7, 1899. Serial No. 732,880. (No specimens.)

*To all whom it may concern:*

Be it known that I, ADOLF CLEMM, a subject of the Emperor of Germany, and a resident of Mannheim, Germany, have invented certain new and useful Improvements in the Manufacture of Sulfuric Anhydrid, of which the following is a specification.

I have found that when anhydrous sulfurous acid, along with dried oxygen, (either alone or in a gas mixture, such as air,) is passed over copper sulfate, heated to redness, condensation of the two gases to sulfuric anhydrid takes place freely. The more completely the mutually-reaching gases are dried the better and more perfectly does the action proceed.

In the practical application of this process it is advantageous to present the copper sulfate to be used as contact material in the form of a large surface, and for this purpose, instead of saturating baked clay with copper sulfate, whereby the power of the clay to absorb copper sulfate is limited, I mix crystallized copper sulfate with moistened unbaked clay to form a stiff paste or dough, and then I mold this into balls, plates, tubes, or other suitable forms. On heating these the water in the paste or dough, particularly the water of crystallization, is driven off in such a way that a highly-porous material is produced particularly adapted for the action in view. More or less copper sulfate is employed, according to the varying nature of the clay. The clay which I use is mixed with an equal weight of copper sulfate.

The sulfurous acid may be obtained from any convenient source and can be brought into action not only with the heat arising from its production, but also with the aid of heat applied externally for the purpose of roasting the contact material and the gases.

Materials having properties similar to those of clay—such as gypsum, for example—can be used instead of clay.

Having now particularly described and ascertained the nature of my said invention and in what manner the same is to be performed, I declare that what I claim is—

1. The herein-described process of producing sulfuric anhydrid, which consists in leading a mixture of sulfurous acid and air, all in a state as free from water as possible, over sulfate of copper which is heated to a red heat.

2. The herein-described process of producing sulfuric anhydrid, which consists in first mixing unburnt moistened clay with crystallized sulfate of copper, forming therefrom pieces, drying them, and then leading a mixture of sulfurous acid and air, all in a state as free from water as possible, over the said dried pieces while the latter are heated to a red heat.

In testimony whereof I have signed my name to this specification in the presence of two subscribing witnesses.

ADOLF CLEMM.

Witnesses:
  J. ADRIAN,
  H. VOGELGESANG.